United States Patent
Georg et al.

(10) Patent No.: US 9,438,518 B2
(45) Date of Patent: Sep. 6, 2016

(54) METHOD AND DEVICE FOR CONTROLLING DSP CHANNELS

(71) Applicants: Detlef Georg, Cologne (DE); Gunter Marx, Muhlheim (DE); Roland Roth, Gelsenkirchen (DE); Norbert Schonfeld, Dortmund (DE); Michael Willmann, Witten (DE)

(72) Inventors: Detlef Georg, Cologne (DE); Gunter Marx, Muhlheim (DE); Roland Roth, Gelsenkirchen (DE); Norbert Schonfeld, Dortmund (DE); Michael Willmann, Witten (DE)

(73) Assignee: Unify GmbH & Co. KG, Munich (DE)

(*) Notice: Subject to any disclaimer, the term of this patent is extended or adjusted under 35 U.S.C. 154(b) by 262 days.

(21) Appl. No.: 14/103,149

(22) Filed: Dec. 11, 2013

(65) Prior Publication Data

US 2014/0169165 A1    Jun. 19, 2014

(30) Foreign Application Priority Data

Dec. 19, 2012    (DE) .................. 10 2012 024 881

(51) Int. Cl.
*H04L 12/803*    (2013.01)
*H04L 12/26*    (2006.01)
*G06F 9/50*    (2006.01)

(52) U.S. Cl.
CPC ............ *H04L 47/122* (2013.01); *G06F 9/505* (2013.01); *H04L 43/0882* (2013.01)

(58) Field of Classification Search
None
See application file for complete search history.

(56) References Cited

U.S. PATENT DOCUMENTS

| | | | | |
|---|---|---|---|---|
| 6,104,721 A * | 8/2000 | Hsu | .......... | H04L 29/06 370/431 |
| 6,338,130 B1 * | 1/2002 | Sinibaldi | .......... | G06F 9/505 712/35 |
| 6,473,731 B2 * | 10/2002 | Hinderks | .......... | H04B 1/665 704/200.1 |
| 6,925,641 B1 * | 8/2005 | Elabd | .......... | G06F 9/505 710/1 |
| 7,929,441 B1 * | 4/2011 | Ganesamoorthi | .......... | H04L 47/805 370/235 |
| 2004/0254796 A1 * | 12/2004 | Lehtimaki | .......... | H04W 88/181 704/500 |
| 2005/0141520 A1 * | 6/2005 | Sim | .......... | H04L 29/06027 370/395.52 |
| 2006/0067326 A1 * | 3/2006 | Luo | .......... | G06F 9/5027 370/395.4 |
| 2008/0120621 A1 * | 5/2008 | Yamatsu | .......... | G06F 9/5027 718/104 |
| 2009/0175215 A1 * | 7/2009 | Chen | .......... | H04W 76/022 370/328 |

* cited by examiner

*Primary Examiner* — Hassan Phillips
*Assistant Examiner* — Gautam Sharma
(74) *Attorney, Agent, or Firm* — Buchanan Ingersoll & Rooney PC

(57) ABSTRACT

Described is a method for channel management on one or more digital signal processors. The method distinguishes itself by the fact that channel management occurs at any time based on a current load utilization of each digital signal processor, taking into account an actual load requirement of each channel and a maximum total performance capacity of each digital signal processor. The invention also relates to a device for carrying out the method.

20 Claims, 6 Drawing Sheets

METHOD AND DEVICE FOR CONTROLLING DSP CHANNELS

FIELD OF INVENTION

The invention relates to a method and a device for controlling DSP channels, or more precisely for managing channels on digital signal processors.

BACKGROUND OF THE INVENTION

In telecommunication applications and equipment, digital signal processing is often employed in particular for establishing and maintaining connections and for transmitting voice signals using digital signal processors (DSPs). DSPs are also used for digital encoding and decoding of signals, in particular of voice signals. Predefined processes, called codecs, are accessed for encoding and decoding transmitted signals. Examples of audio codecs are known under the designations G.711, G.722, G.723, G.728, G.729, T.38, etc. and are standardized; among other things, they differ from each other by the required computing performance (so-called performance requirement). A DSP overload occurs if the performance requirement of a codec exceeds the available performance of a DSP. This may occur when a connection is newly assigned to a channel of a DSP by a channel management process running on one of the host processors or by a codec change on a channel as requested by a connection partner. The voice quality of a transmission channel may suffer in such a case or the channel and/or the connection may be interrupted.

In order to avoid overloading the DSPs and the associated connection interruptions and/or poor voice quality, it is known to carry out channel management on the basis of the most computationally intensive codecs. This means that a channel is established only if the DSP intended for this purpose has sufficient capacity to maintain the channel even with the codec that requires the greatest computational performance. The establishment of a connection can then be rejected early on, and a change of codecs, which can be requested by the partner or become necessary due to performance features, is possible at any time.

If a codec with less than the highest computational performance is used at a certain point in the course of the channel management process, then capacities are provided that are not needed at that time. Thus, the DSP is not utilized optimally.

The problem addressed by the present invention is that of providing secure channel management that can avoid overload and at the same time can better utilize the capacity of a DSP, or can better utilize its computational capacity.

SUMMARY OF THE INVENTION

According to the invention, this problem is solved by the features of the independent claims. Advantageous embodiments and developments of the invention are provided in the dependent claims.

According to one aspect of the invention, a method for channel management on digital signal processors (DSP) is proposed, whereby channel management occurs at any time on the basis of each DSP's current load utilization, taking into account an actual performance requirement for each channel and a maximum total performance capacity of each DSP. This allows for dynamic channel management in which a determination is made regarding the actual current load at any moment when a channel management process that concerns a performance requirement is being carried out. This can avoid rigid reservation of performance reserves that are in fact currently not needed, and thus can improve the load utilization of the DSP. Channel management here refers in particular to the assignment of resources of DSPs such as, but not limited to, new assignment of a channel when a connection is to be established, or the release of performance power if the performance requirements change for an existing communication connection.

In one further advantageous embodiment of the invention, a safety margin is taken into account for the actual load utilization by currently assigned channels or channels to be assigned when determining the load capacity of a given DSP. A safety margin is able to allow dynamically for fluctuations in performance capacity and/or in requirements, for example by changes in the codec while communication is in progress. Here, an assigned channel refers to a channel where communication is already in progress, and a channel to be assigned refers to a request being processed to newly assign a channel for communication.

Preferably, the safety margin is computed from the difference between a maximum performance requirement and a minimum performance requirement of all codecs supported by a given DSP and a factor of increase. This computation allows for optimizing the safety margin individually to a potential change in the performance requirement by codec changes within the scope of codecs that are indeed supported by the DSP. The difference indicates the greatest possible jump in performance requirement that would occur when changing from the codec with the lowest performance requirement to the codec with the greatest performance requirement, while the factor of increase is to be understood as the factor that indicates the greatest number of performance requirement jumps that shall be handled simultaneously.

It is particularly preferred to determine the factor of increase, the performance requirement values of the supported codecs and the maximum overall performance capacity in advance for each DSP. The performance requirement values of the supported codecs and the maximum overall performance capacity can be understood as the configuration data for each DSP. These configuration data can be determined from data sheets, for example, and/or through actual measurements. The determination of the factor of increase can be a specification for each configuration on the basis of empirical values, for example, and/or boundary conditions of the operational environment. Technically, the configuration data can be set via system configuration, e.g., web-based management, as a non-limiting example.

In a further advantageous embodiment of the invention, channel management is carried out by a central instance and multiple decentralized instances. In terms of the invention, an instance can refer to a partial process or a sub-routine of an entire process, i.e., a software unit and/or a hardware unit. The division into a central instance and multiple decentralized instances allows the performance of process steps that affect multiple DSPs in a parent process, and the performance of process steps that affect only a single DSP in an individualized process, with the ability of parallel processing of multiple individualized processes in addition to the parent process that is running continuously in the background.

It is particularly preferred that the decentralized instances be designed and configured to transfer performance data from the DSP assigned to them to the central instance. This allows, for example, for the configuration data and the safety margin of an individual DSP to be initialized, for the current load to be determined dynamically in the decentralized instance, and for the central instance to be provided virtually in real time, in order to be used there for the parent load balancing processes.

It is particularly preferred that the decentralized instances can be requested by the central instance. In this manner, processes of the decentralized instances can be requested from the central instance if needed. Requests concerning, for example, the new establishment of a communications channel can be pre-processed from the central instance while the respective decentralized instance is called up for a concrete channel assignment and a new calculation of load utilization.

The method preferably includes the steps to be performed by a central instance:
  Receiving a channel request;
  Determining DSPs that are available for a new channel assignment as available DSPs, based on a first relationship for each DSP between a current load utilization, a maximum total load capacity and a load requirement of a request for a new channel assignment directed to the DSP; and
  If the determination of available DSPs indicates that no DSP is available: Rejecting of the channel request.
  Otherwise: Determining the DSP that has the lowest current load utilization among all available DSPs, to be the designated DSP on the basis of a second relationship for each available DSP between a current load utilization, a maximum total performance capacity and a performance requirement of a new channel assignment request currently directed to the DSP, whereby each performance requirement of a request for a new channel assignment is preferably determined on the basis of the greatest performance requirement among all of the codecs supported by the DSP, and directing a request for a new channel assignment to a decentralized instance that is associated with the designated DSP.

In terms of the invention, a channel request refers to a request to establish a communication channel directed to the central instance. In terms of the invention, a request to assign a new channel refers to a prompt to establish a new communication channel directed by the central instance to a decentralized instance.

The method is particularly suited for managing a request for assigning a new channel. The current load utilization of the DSPs can be taken into account dynamically for managing the channels. If the first relationship to determine available DSPs also includes a safety margin, it is possible to allow dynamically for fluctuations in performance capacity and/or in requirements, for example through changes in the codec while communication is in progress.

In one preferred embodiment, the method includes the steps to be carried out by a decentralized instance:
  Receiving a request for a new channel assignment from the central instance;
  Checking to see if a channel of the DSP is available based on a third relationship between a current load utilization, a maximum total performance capacity and a maximum performance request of all codecs supported by the DSP; and
  Confirming to the central instance the request for a new channel assignment if a channel is available or rejecting the request for a new channel assignment if no channel is available.

Particularly preferred is having the third relationship include a safety margin for checking. If a channel is available, the following steps can then be carried out additionally by the decentralized instance:
  Recomputation of the current load utilization while taking into account the actual load requirement for the requested codec; and
  Reporting the newly computed current load utilization to the central instance.

In this manner, the performance data of the designated DSP can be provided virtually in real time to the central instance for further management steps. The central instance can access updated performance or load utilization data at any time. This allows for better utilization of the system's performance reserves and for increasing the system's efficiency and performance capability.

From another perspective, the invention also relates to a device for channel management on digital signal processors that are designed and configured to carry out the method described above. In particular, the device can be designed and configured to implement a central instance and multiple decentralized instances. It is understood that implementation of instances can be accomplished through separate hardware components and/or through computer program constructs either on the same or on separate hardware components.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments, unless this is obviously inapplicable for technical or physical reasons. Exemplary embodiments can be combined with other exemplary embodiments and that combination can also be considered an exemplary embodiment of the invention.

The invention is described below in more detail based on preferred exemplary embodiments and with reference to the figures.

The figures are schematic presentations and not necessarily according to scale. The presentations in drawings and the descriptions thereof shall be considered exemplary illustrations of the principle of the invention and shall in no way restrict the invention.

DESCRIPTION OF THE PREFERRED EMBODIMENTS

Figure 1:
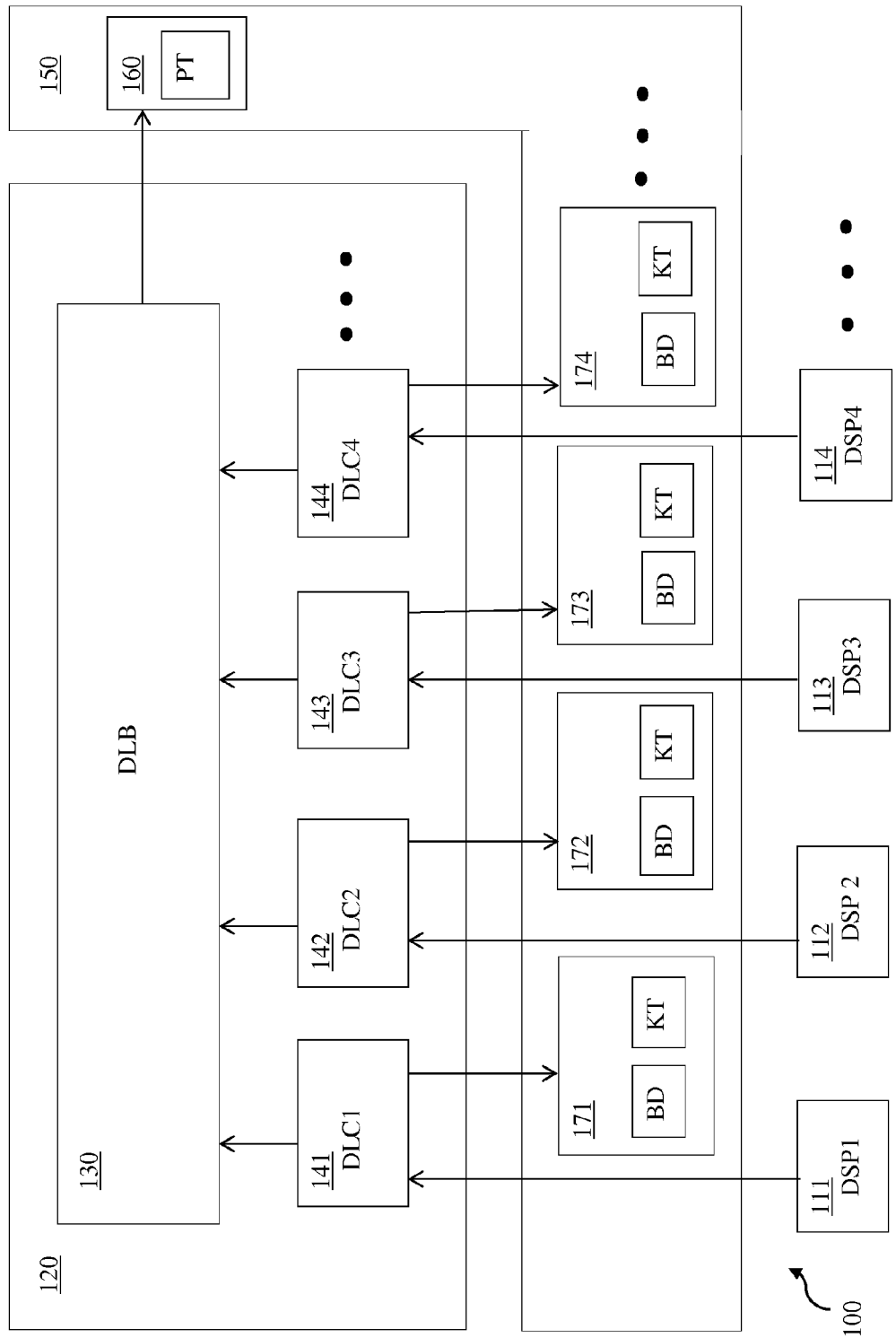
FIG. 1 is a schematic presentation of a system according to one preferred exemplary embodiment.

As illustrated in FIG. 1, according to a preferred exemplary embodiment of the present invention, the system 100 includes four digital signal processors (hereinafter abbreviated as DSP) 111 (DSP1), 112 (DSP2), 113 (DSP3), 114 (DSP4), a host processor 120 and a memory 150. Without restricting the generality, in this exemplary embodiment the system is a gateway apparatus in a telecommunications device, and the digital signal processors 111-114, the host processor 120 and the memory 150 are housed on the same printed circuit board. As an alternative, the components can be housed on different boards. In deviation from the example, the host processor 120, the memory 150 and the digital signal processors 111-114 can be implemented in separate devices. In particular the memory 150 can be distributed across several boards.

A host processor 120 is provided to carry out the channel management of voice communication channels (hereinafter simply called "channels") on the DSPs 111-114. The host processor 120 includes a central load balancing process (hereinafter abbreviated as DLB or DLB process for "DSP load balancing process") 130 and for each DSP present in the system a dedicated DSP load controller process (hereafter abbreviated as DLC or DLC process for "DSP load controller process") 141, 142, 143, 144. Expressed more precisely, the DLC 141 (DLC1) is assigned to the digital signal processor 111 (DSP1), the DLC 142 (DLC2) to the digital signal processor 112 (DSP2), the DLC 143 (DLC3) to the digital signal processor 113 (DSP3), and the DLC 144 (DLC4) to the digital signal processor 114 (DSP4).

It is understood that the arrangement with four DSPs is only exemplary. Fewer or more DSPs can be present in the system in preferred variations. In an extreme case, the invention can be applied to one single DSP as well.

The memory 150 includes a DLB memory area 160 and for each DLC (DLC1-DCL4) a dedicated DLC memory area 171-174. A performance table PT is set up in the DLB memory area 160, said performance table describing a utilization state of the system from the perspective of the DLB process 130. An area for base data BD and a channel assignment table KT are set up in each DLC memory area 171-174.

Expressed more precisely, base data BD and a channel assignment table KT for DSP 111 (DSP1) are stored in the dedicated memory area 171, base data BD and a channel assignment table KT for DSP 112 (DSP2) are stored in the dedicated memory area 172, base data BD and a channel assignment table KT for DSP 113 (DSP3) are stored in the dedicated memory area 173, and base data BD and a channel assignment table KT for DSP 114 (DSP4) are stored in the dedicated memory area 174. Here, the base data BD describe a basic configuration of the DSP controlled by the respective DLC, and the channel assignment tables KT describe a channel assignment status of the respective DSP.

Figure 2:
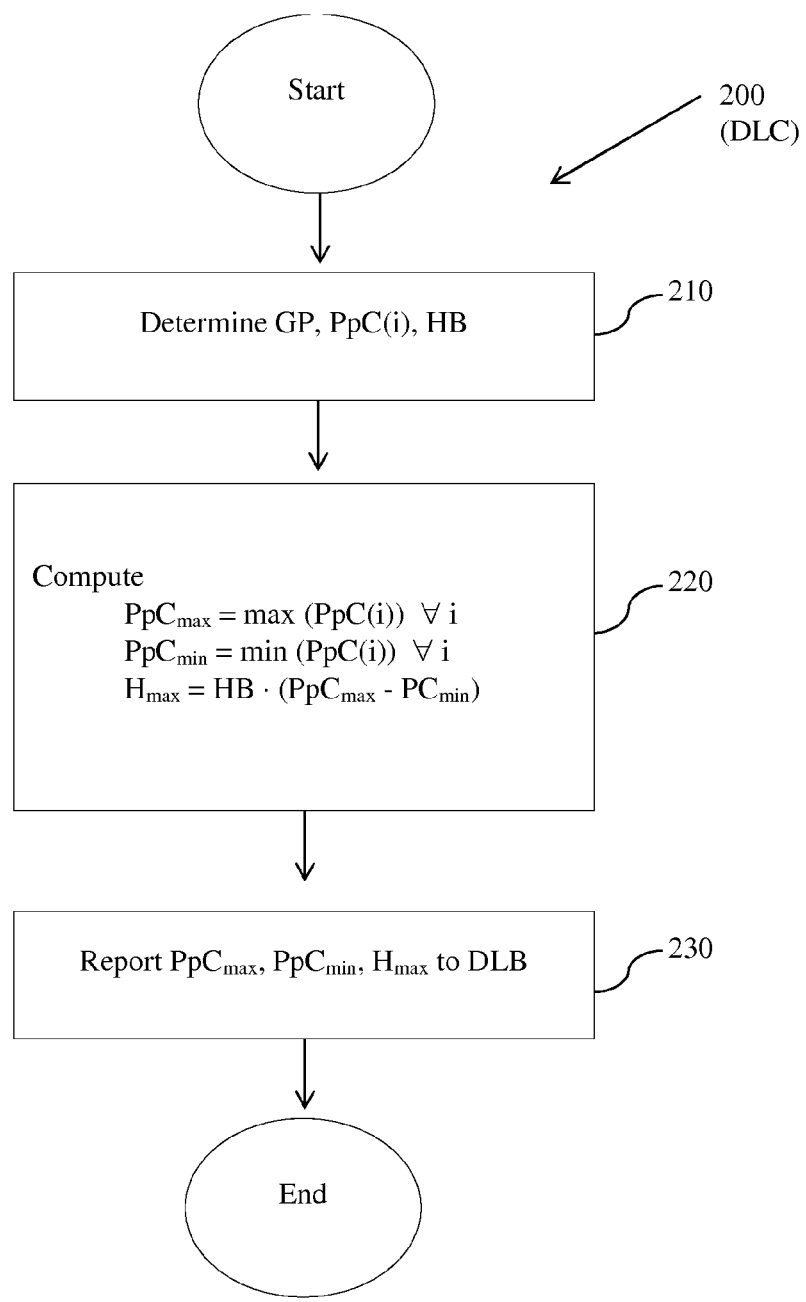
FIG. 2 is a schematic presentation of a process to determine and report performance data.

FIG. 2 shows the registration process for a digital signal processor, for example one of the digital signal processors 111-114 (FIG. 1), as it is depicted schematically by a DSP load controller process (DLC), in particular each of the DLCs 141-144 in FIG. 1, for registration of a DSP at the central load balancing process DLB 130 of FIG. 1 according to the preferred exemplary embodiment of the present invention.

According to the presentation in FIG. 2, the registration process 200 includes a determination step 210, a computation step 220 and a notification step 230.

A numeric total performance value GP of the respective DSP, a performance requirement PpC(i) (i=1 ... n) for each of n codecs supported by the DSP as well as a hysteresis requirement HB of the DSP are determined in the determination step 210.

For example, the first DSP 111 (DSP1) of FIG. 1 has a total numeric performance value $GP_{max}=100$ and a hysteresis requirement HB=2 and supports codecs G.711, G.722, G.723, G.729 and T.38. Furthermore, it shall be assumed that the named codecs have a performance requirement PpC according to Table 1 below:

TABLE 1

| Performance requirement of various codecs | | |
|---|---|---|
| i | Codec | PpC |
| 1 | G.711 | 8 |
| 2 | G.722 | 10 |
| 3 | G.723 | 14 |
| 4 | G.729 | 20 |
| 5 | T.38 | 18 |

The values for $GP_{max}$ and the supported codecs are determined from data sheets and/or actual measurements and are stored as base data BD in the respective dedicated storage area 171, ..., 174. The hysteresis requirement HB is specified for each configuration, for example.

A maximum and a minimum performance requirement $PpC_{max}$, $PpC_{min}$ as well as a maximum hysteresis $H_{max}$ of DSP 111 (DSP1) are computed in computation step 220, with the values determined in step 210 used for the computation.

Accordingly, for DSP 111 (DSP1) the maximum performance requirement for $$PpC_{max1} \text{ is calculated as} = MAX(PpC(i)(i = 1 ... 5) \quad \text{(Equation 1)}$$
$$= MAX(PpC(G.711), MAX(PpC(G.722),$$
$$PpC(G.273), PpC(G.729),$$
$$PpC(T.38)$$
$$= MAX(8, 10, 14, 20, 18)$$
$$= 20$$

the minimum performance requirement for $$PpC_{min1} = MIN(PpC(i)(i = 1 ... 5) \quad \text{(Equation 2)}$$
$$= MIN(PpC(G.711), PpC(G.722), PpC(G.273),$$
$$PpC(G.729), PpC(T.38)$$
$$= MIN(8, 10, 14, 20, 18)$$
$$= 8$$

and the maximum hysteresis for $$H_{max1} = (PpC_{max1} - PpC_{min1}) * HB \quad \text{(Equation 3)}$$
$$= (20 - 8) * 2$$
$$= 24$$

In the notification step 230, the three parameters $GP_{max1}=100$, $PpC_{max1}=20$ and $H_{max1}=24$ for DSP 111 (DSP1) are reported to the DLB. In terms of the invention, the maximum hysteresis $H_{max}$ is a safety margin and the hysteresis requirement HB is a factor of increase, the performance requirement PpC is a performance requirement of a codec, and the total numeric performance value $GP_{max}$ is a maximum total performance capacity of a DSP.

In the present exemplary embodiment, the registration process 200 is carried out in each of the DLC 141-144 for the respective associated DSP 111-114. For example, DLC 142 (DLC2) reports for the DSP 112 (DSP2) the values $GP_2=200$, $PpC_{max2}=25$ and $H_{max2}=30$, DLC 143 (DLC3) for the DSP 113 (DSP3) the values $GP_3=200$, $PpC_{max3}=25$ and $H_{max3}=30$, and DLC 144 (DLC4) for the DSP 114 (DSP4) the values $GP_4=120$, $PpC_{max4}=10$ and $H_{max4}=16$ to the DLB 130.

The reported values are stored in performance table 160 (FIG. 1) PT in the DLB memory area 160 of memory 150. After registering all DSPs 111-114, for example after booting up the system, the performance table may show the following values, for example:

TABLE 2

Performance table after boot-up

| DSP | $GP_{max}$ | $GP_{current}$ | $GP_{inProc}$ | $PpC_{max}$ | $H_{max}$ |
|---|---|---|---|---|---|
| 1 | 100 | 0 | 0 | 20 | 24 |
| 2 | 200 | 0 | 0 | 25 | 30 |
| 3 | 200 | 0 | 0 | 25 | 30 |
| 4 | 120 | 0 | 0 | 10 | 16 |

Preferably, the maximum performance requirement $PpC_{max}$ is also stored in the base data BD of the respective dedicated memory area 171, . . . , 174 of memory 150 for further use and from there is accessed by the various processes of the respective DLCs 141, . . . , 144. It is alternatively also possible that the processes of DLC 141-144 access the performance table PT in the DLB memory area 160; this would save storage space, but it may require additional effort in data management, assignment and processing.

For the next scenario, it is assumed that the system has run for some time and that some channels are being switched. For example, the condition of the system is described at an examined point in time using the following performance table:

TABLE 3

Performance table at a particular operating time

| DSP | $GP_{max}$ | $GP_{current}$ | $GP_{inProc}$ | $PpC_{max}$ | $H_{max}$ |
|---|---|---|---|---|---|
| 1 | 100 | 90 | 0 | 20 | 24 |
| 2 | 200 | 120 | 0 | 25 | 30 |
| 3 | 200 | 80 | 1 | 25 | 30 |
| 4 | 120 | 70 | 2 | 10 | 16 |

In Table 3 and in all following tables, values that have changed when compared to the respective next older tables are shown in bold type.

Thus, according to Table 3, DSP1 (111 in FIG. 1) at the observed time handles channels with a total performance ($GP_{current}$) of 90, DSP2 (112 in FIG. 1) handles channels with a total performance of 120, DSP3 (113 in FIG. 1) handles channels with a total performance of 80, and DSP4 (114 in FIG. 1) handles channels with a total performance of 70. At the same time, the load controller process DLC of DSP 3 is currently processing a request for a new channel assignment ($GP_{inProc}$) and DLC of DSP 4 is currently processing two such requests.

Figure 3:
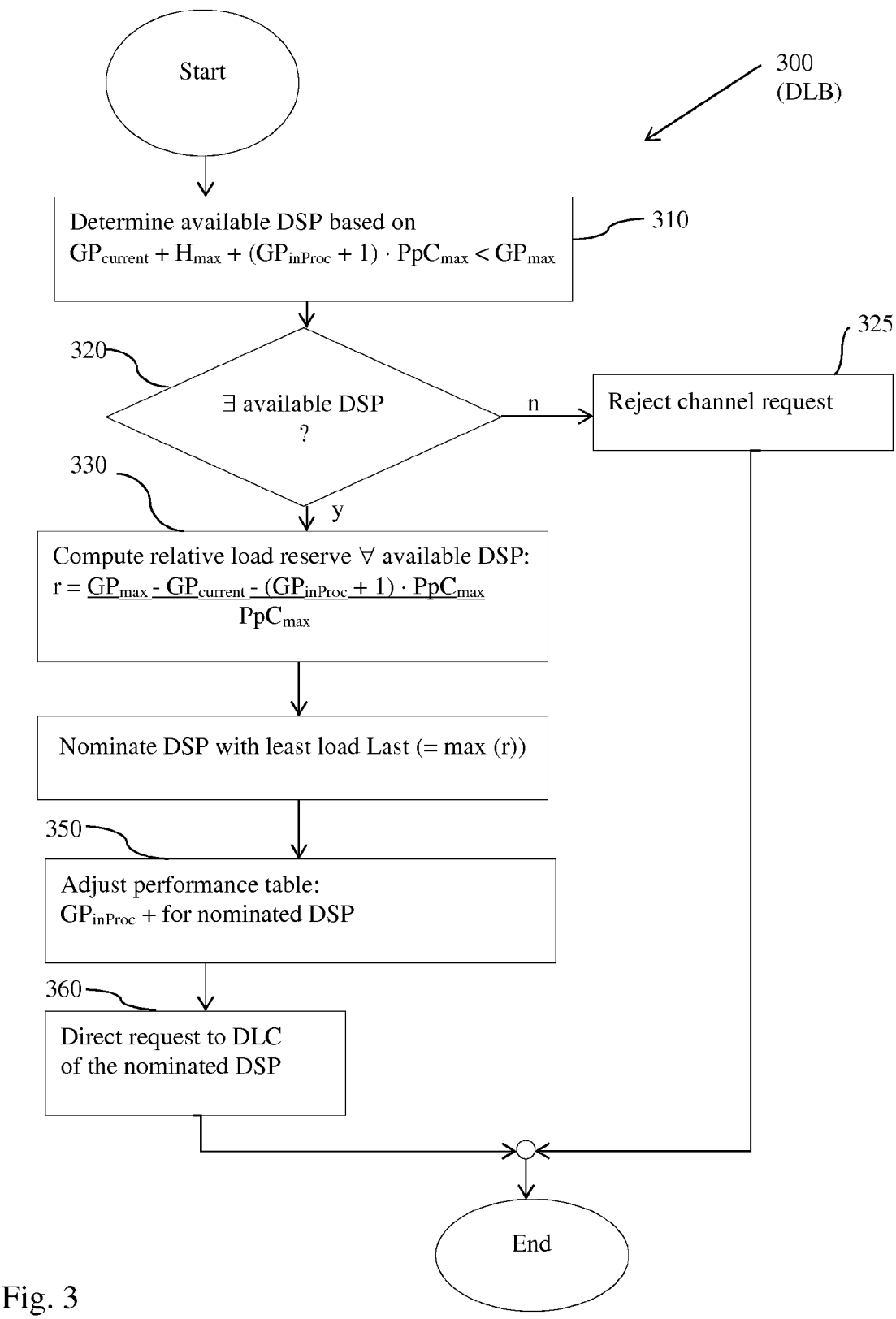
FIG. 3 is a schematic presentation of a central process for processing a channel request.

FIG. 3 illustrates, in the form of a flow diagram, a process 300 carried out in the DLB for processing a new channel request.

Such a channel request is initially directed to the DLB process. Process 300 is accordingly a sub-routine that is called up in the running DLB process when a new channel request is made to the system.

Available DSPs are determined in a step 310 after the start of process 300. An available DSP is understood to be a DSP whose currently reported total performance, which is stored in the performance table, is lower than the maximum performance of the respective DSP, taking into account the maximum hysteresis and the currently processed and newly added channel request as well as the respective performance requirement. Thus, in this process step a DSP is considered available if the condition:

$$GP_{current} + H_{max} + (GP_{inProc}+1)*PpC_{max} < GP_{max} \quad \text{(Equation 4)}$$

is met The computation in step 310 can be illustrated in the following table:

TABLE 4

Computation of available DSPs

| DSP | $GP_{current} + H_{max} + (GP_{inProc} + 1) * PpC_{max}$ | Res. | $GP_{max}$ | Res. < $GP_{max}$ |
|---|---|---|---|---|
| 1 | 90 + 24 + (0 + 1) * 20 | 134 | 100 | false |
| 2 | 120 + 30 + (0 + 1) * 25 | 175 | 200 | true |
| 3 | 80 + 30 + (1 + 1) * 25 | 160 | 200 | true |
| 4 | 70 + 16 + (2 + 1) * 10 | 116 | 120 | true |

Step 320 evaluates if there is at least one available DSP among the existing DSPs. This is the case when at least one of the computation results is true. If the evaluation in step 320 is negative (i.e., no DSP is available), the process 300 branches to step 325, otherwise to step 330.

In step 325, which follows a negative evaluation in step 320, the channel request is rejected and then the process ends. Generally, an end of a process refers to a return to a called up process, here in particular the parent DLB process of process 300.

In step 330, which follows a positive evaluation in step 320, a relative load reserve r is computed for all DLPs that have been evaluated in step 310 as being available according to the relationship $$r=(GP_{max}-GP_{current}-(GP_{inProc}+1)*PpC_{max})/PpC_{max} \quad \text{(Equation 4)}$$

The computation in step 330 can be illustrated in the following table:

TABLE 5

Computation of the relative load reserve r

| DSP | $GP_{max} - GP_{current} - (GP_{InProc} + 1) * PpC_{max})/PpC_{max}$ | Res. = r |
|---|---|---|
| 1 | No computation | n.n |
| 2 | (200 − 120 − (0 + 1) * 25)/25 | 2.2 |
| 3 | (200 − 80 − (1 + 1) * 25)/25 | 2.8 |
| 4 | (120 − 70 − (2 + 1) * 10)/10 | 2 |

The DSP having the lowest load among all available DSPs is determined in the subsequent step 340. The load reserve computed in step 330 is used for this purpose. The load reserve computed in step 330 (it is a relative load reserve that is related to the maximum load of the codec that is supported by the respective DSP) is a measure for the current load (or load utilization) of the respective DSP. Accordingly, in the following example, DSP3 with a load reserve of 2.8 is determined to be the DSP with the lowest load.

The performance table is updated in the subsequent step 350 by increasing the value $GP_{InProc}$ for the DSP with the lowest current load as determined in step 340 by "1". I.e., the value $GP_{InProc}$ is incremented by "1" for DSP3. After step 350, the performance table looks as follows:

TABLE 6

Performance table after the update for the channel request

| DSP | $GP_{max}$ | $GP_{current}$ | $GP_{InProc}$ | $PpC_{max}$ | $H_{max}$ |
|---|---|---|---|---|---|
| 1 | 100 | 90 | 0 | 20 | 24 |
| 2 | 200 | 120 | 0 | 25 | 30 |
| 3 | 200 | 80 | 2 | 25 | 30 |
| 4 | 120 | 70 | 2 | 10 | 16 |

As can be seen in table 6, the value $GP_{InProc}$ for DSP3 has risen from "1" to "2" when compared to table 3.

In the subsequent step 360, a request for a new channel assignment is transmitted to the DSP that has been determined in step 340 to have the lowest load or the greatest relative load reserve r, respectively. Thus, the request is transmitted to DSP3 (r=2.8) in the present example.

The process then ends or returns to the calling process.

Figure 4:
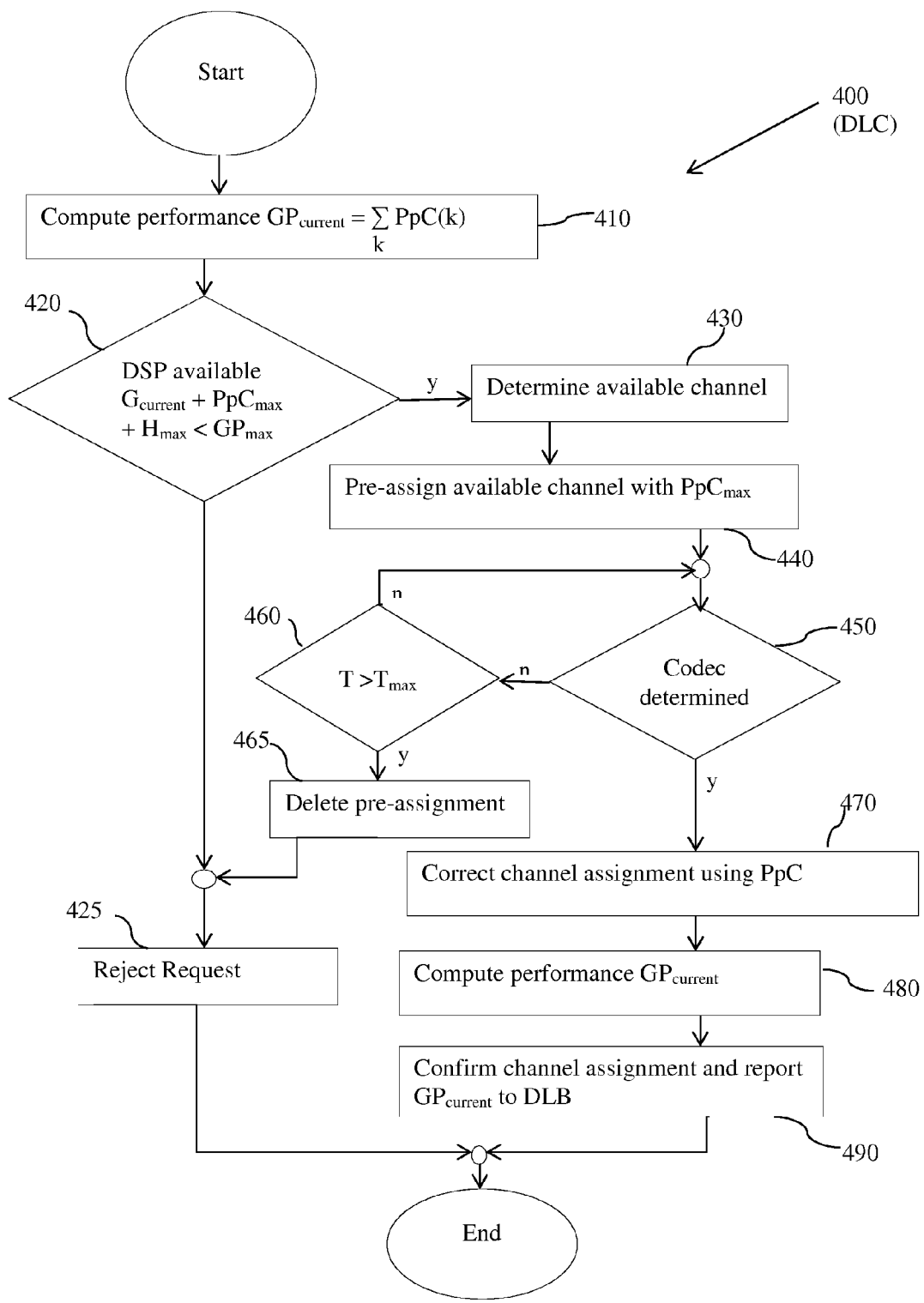
FIG. 4 is a schematic presentation of an individual process for processing a request for a new channel assignment.

FIG. 4 illustrates, in the form of a flow diagram, a process 400 carried out in the DLC process for processing a prompt or a request for a new channel assignment (setting up a communications channel).

Process 400 is a sub-routine that is called up in the running DLC process of a DLB if a request for a new channel assignment is transmitted by the DLB process or its channel request process 300 to this DLB (see step 360 in FIG. 3). The process 400 can be called up multiple times, i.e., in parallel for multiple requests.

After process 400 is started or called up, the actual current performance $GP_{current}$ of the associated DLB is initially computed in step 410. This computation can be expressed by the relationship $$GP_{current} = \sum_{k=1}^{K} PpC(k) \quad \text{(Equation 5)}$$

where k is a control variable for the summation and K is the number of all (assigned and available) channels in the DSP.

In the present example, DSP3 has been determined to be the DSP with the lowest load by using DLB (130 in FIG. 1) in the process 300 illustrated in FIG. 3, and thus the request for a new channel assignment has been transmitted to DSP3. The current channel assignment for DSP3 shall be expressed by the following table:

TABLE 7

Channel assignment when process 400 is called up

| | Channel k | | | |
|---|---|---|---|---|
| | 1 | 2 | 3 | ... |
| Codec | G.723 | (—) | G.711 | ... |
| PpC | 14 | 0 | 8 | ... |

It should be noted that the channel assignment table KT can include both rows "Codec" and "PpC" of Table 7 but only needs to include one of the named rows, because the channel's assignment is defined unambiguously by either specifying the codec itself or by specifying the associated performance PpC. Thus, only one identification can be stored for the codec in the channel assignment table KT for every channel, whereby the link between the codecs and the associated performance value is provided in the base data BD of the respective memory area 171, . . . , 174 (FIG. 1). Alternatively, when assigning a channel, the performance value of the agreed upon codec can be retrieved from the base data BD and stored in the channel assignment table KT. Table 7 and the channel assignment tables provided below are thus used primarily for the purpose of illustrating and reproducing the numeric example. In terms of the invention, the performance PpC of each channel is an actual performance requirement of the channel.

Equation 5 used in step 410 accesses the values of Table 7.

The subsequent step 420 evaluates whether the DSP is indeed available. The evaluation in step 420 is positive if the relationship $$GP_{current} + PpC_{max} + H_{max} < GP_{max} \quad \text{(Equation 6)}$$

is met.

If the evaluation in step 420 is negative, i.e., if it has been determined that no DSP is available, the process branches to step 425, otherwise to step 430.

In step 425, which follows a negative evaluation in step 420, the channel request is rejected and then the process 400 ends.

It should be noted that the inspection through step 420 (including the computation in step 410) is carried out at the beginning of process 400, even if the DSP has been determined to be available in the DLB channel request process 300 (FIG. 3). The DLB channel request process 300 (FIG. 3) accesses the data that have already been reported in the performance table. It is possible, however, that codec switching has occurred in the meantime in one or more channels of the DSP that have not yet been reported to the DLB process. Thus, the actual performance value $GP_{current}$ may have changed (increased) as well, making the DSP no longer available. It must therefore be possible to reject a request for a new channel assignment at this level.

An available channel is determined in step 430, which follows a positive evaluation in step 420. This can be any available channel; it is important only that the channel be identifiable unambiguously in the channel assignment table. The available channel determined in step 430 is designated as a normalized channel below. In the present numeric example, channel no. 2 is determined to be available according to table 7 and is designated.

In the subsequent step 440, the channel designated in step 430 is initially pre-assigned with the maximum performance value $PpC_{max}$. For the present numeric example, $PpC_{max}$ for the requested DSP3 comes from the performance table PT (table 3) or from the base data BP for the DSP 3. Accordingly, the channel assignment will look as shown in the following table.

TABLE 8

Channel assignment after pre-assignment

| | Channel k | | | |
|---|---|---|---|---|
| | 1 | 2 | 3 | ... |
| Codec | G.723 | $PpC_{max}$ | G.711 | ... |
| PpC | 14 | 20 | 8 | ... |

As illustrated in Table 8, the previously available channel 2 is pre-assigned by the maximum performance value $PpC_{max}$ (=20).

The next step 450 checks to see whether the codec has already been determined for the channel request. This is done by receiving partner data, i.e., a destination device of the desired communications channel. If the test in step 450 is negative, i.e., a codec has not been received for the channel request, process 400 branches to step 460, otherwise to step 470.

Step 460, which follows a negative check in step 450, checks to see whether a maximum waiting time $T_{max}$ has passed. The definition of a maximum waiting time $T_{max}$ is useful to avoid an endless loop that could lead to continuous pre-assignment of channels for channel requests that have become obsolete.

If the check in step 460 is negative, i.e., the maximum waiting time $T_{max}$ has not passed, process 400 returns to the check in step 450 in order to check again for whether the codec has been determined in the meantime.

If the check in step 460 is positive, i.e., the maximum waiting time $T_{max}$ has passed, process 400 branches to step 465 in order to delete the pre-assignment of the nominated channel after expiration of the maximum waiting time $T_{max}$. In other words, the entry of the codec for the designated channel is deleted in the channel assignment table KT, or the performance value PpC is set to "0" for the designated channel, in step 465, which is reached when the maximum waiting time $T_{max}$ has passed. Process 400 then jumps to step 425 in order to reject the request for a new channel assignment, and process 400 ends.

The channel assignment for the designated channel is corrected in step 470, which follows a positive check in step 450. I.e., the identification for the determined codec and/or the performance value PpC for the determined codec are stored in the performance assignment table KT for the designated channel. For the present numeric example, the determined codec is assumed to be G.723. Accordingly, the channel assignment after step 470 will look as shown in the following table.

TABLE 9

Channel assignment after the correction

| | Channel k | | | |
|---|---|---|---|---|
| | 1 | 2 | 3 | ... |
| Codec | G.723 | G.723 | G.711 | ... |
| PpC | 14 | 14 | 8 | ... |

As is apparent from Table 9, channel 2, which previously has been pre-assigned with $PpC_{max}=20$, is now assigned with a performance value PpC=14 through codec G.723.

In the subsequent step 480, the now applicable total performance value $GP_{current}$ of the DLB (DLB3 in the previous numeric example) is computed according to equation 6 above. In step 490, the channel assignment is then confirmed to the DLB process and $GP_{current}$, which has been computed in step 480, is reported to the DLB process. Process 400 then ends.

It should be noted that in case of a rejection of the channel request in step 425, there is no new computation and notification of the actual $GP_{current}$, because a change in the total performance can be computed and reported by a different procedure in a corresponding process.

Although not presented in detail in the figure, after every return of the DLC process, the value $GP_{inProc}$ in the performance table PT for the just-called-up DLB is reduced by "1" through the DLB process, because processing of this request for a new channel assignment has ended in the DLC process. If the request for a new channel assignment has been confirmed by the DLC process, the channel request is also concluded in the DLB process. However, if the request for a new channel assignment has been rejected, then the DLB channel request process 300 (FIG. 3) is preferably called up again. As an alternative, the channel request may be rejected permanently by the DLB process after a predetermined number of rejections by the DLC process. It should be noted that the concepts of a channel request and a request for a new channel assignment are differentiated only to differentiate the processing levels. A channel request to the central DLB process is specified as a request for a new channel assignment to a decentralized DLC process, and a request for a new channel assignment processed in the decentralized DLC process concerns a certain channel request that has been directed to the central DLB process.

The new value $GP_{current}$ of the respected DLB that has been reported to the DLB process is written in the DLB process in place of the old value. Thus, in the present numeric example, the performance table contains the following:

TABLE 10

Performance table after channel confirmation

| DSP | $GP_{max}$ | $GP_{current}$ | $GP_{inProc}$ | $PpC_{max}$ | $H_{max}$ |
|---|---|---|---|---|---|
| 1 | 100 | 90 | 0 | 20 | 24 |
| 2 | 200 | 120 | 0 | 25 | 30 |
| 3 | 200 | 94 | 1 | 25 | 30 |
| 4 | 120 | 70 | 2 | 10 | 16 |

Figure 5:
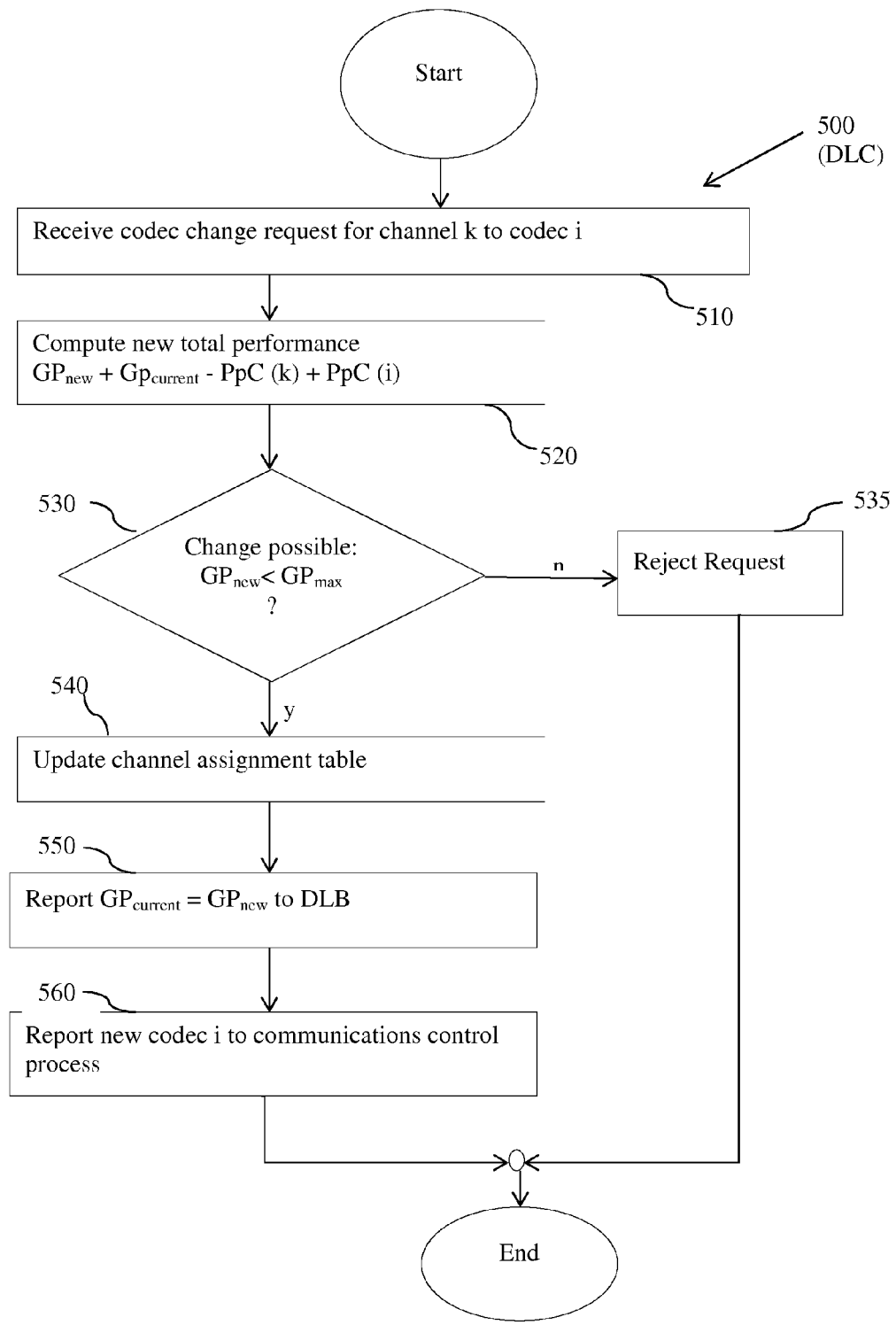
FIG. 5 is a schematic presentation of a process for processing a codec change.

FIG. 5 illustrates, in the form of a flow diagram, a process 500 for processing a request for a codec change in a DSP channel performed in a DLC process. For the numeric example, it shall be assumed that this concerns DSP3 and that a communication partner of the communication carried out via channel 3 desires a codec change from G.711 to G.729.

After process 500 has started or is called up, a request concerning a change for a channel k (here: k=3) from a previous codec to a codec i is received in step 510.

A new total performance of the concerned DSP is computed in the subsequent step 520, taking into account the new codec. Using the values for the present numeric example (DSP3), this computation is expressed by the relationship $$GP_{new} = GP_{current} - PpC(k) + PpC(i) \quad \text{(Equation 7)}$$
$$= GP_{current} - PpC(G.711) + PpC(G.729)$$
$$= 94 - 8 + 20$$
$$= 106$$

The following step 530 evaluates whether a channel change is possible. The evaluation is positive if the relationship $$GP_{new} < GP_{max} \quad \text{(Equation 8)}$$

is true.

If the evaluation in step 530 is negative, process 500 branches to step 535, otherwise to step 540.

In step 535, which follows a negative evaluation in step 530, the codec change is rejected and process 500 ends.

For the numeric example (DSP3), the new value for the total performance $GP_{new}=106$ is smaller than the maximum total performance $GP_{max}=200$, so the evaluation in step 530 is positive.

The channel assignment table for the concerned DSP is updated in step 540, which follows a positive evaluation in step 530. i.e., the value for the codec, or its performance requirement, is overwritten in the channel assignment table KT with the new codec, or its performance requirement. The channel assignment is then expressed by the following table:

TABLE 11

Channel assignment after codec change

| | Channel k | | | |
|---|---|---|---|---|
| | 1 | 2 | 3 | ... |
| Codec | G.723 | G.723 | G.729 | ... |
| PpC | 14 | 14 | 20 | ... |

As apparent from Table 11, the values for channel 3, which have previously been assigned by the values for G.711 (see Table 9) have been overwritten by the values for G.729. If the total performance is included in the base data BD of the DSP, the value $GP_{current}$ is overwritten by the new value $GP_{new}$ in the base data.

In step 550, the new value for $GP_{currentt}=GP_{new}$ is then reported to the DLB process. Although not shown in greater detail in the figure, the performance table is updated with the new $GP_{current}$ for the reporting DSP in the DLB process as is apparent from the following table:

TABLE 13

Performance table after codec change

| DSP | $GP_{max}$ | $GP_{current}$ | $GP_{inProc}$ | $PpC_{max}$ | $H_{max}$ |
|---|---|---|---|---|---|
| 1 | 100 | 90 | 0 | 20 | 24 |
| 2 | 200 | 120 | 0 | 25 | 30 |
| 3 | 200 | 114 | 1 | 25 | 30 |
| 4 | 120 | 70 | 2 | 10 | 16 |

The new codec is then transmitted to a communications control process (not shown in greater detail) in the subsequent step 560. Process 500 then ends.

The communication in channel k is changed to the new codec i by the above-indicated communications control process. The processes required for this purpose, such as handshake or signaling processes, are essentially known and do not need to be described here any further.

It should be noted that process 500 runs essentially in the dedicated DLC process 141, . . . , 144 (see FIG. 1) and not in the central DLB process 130. Through this decentralized processing, process resources are employed only where they are needed; the DLC processes that are assigned to other DSPs and the central DLB process 130 are not affected by processes that concern only a particular DSP, except for central updating of the performance table.

Figure 6:
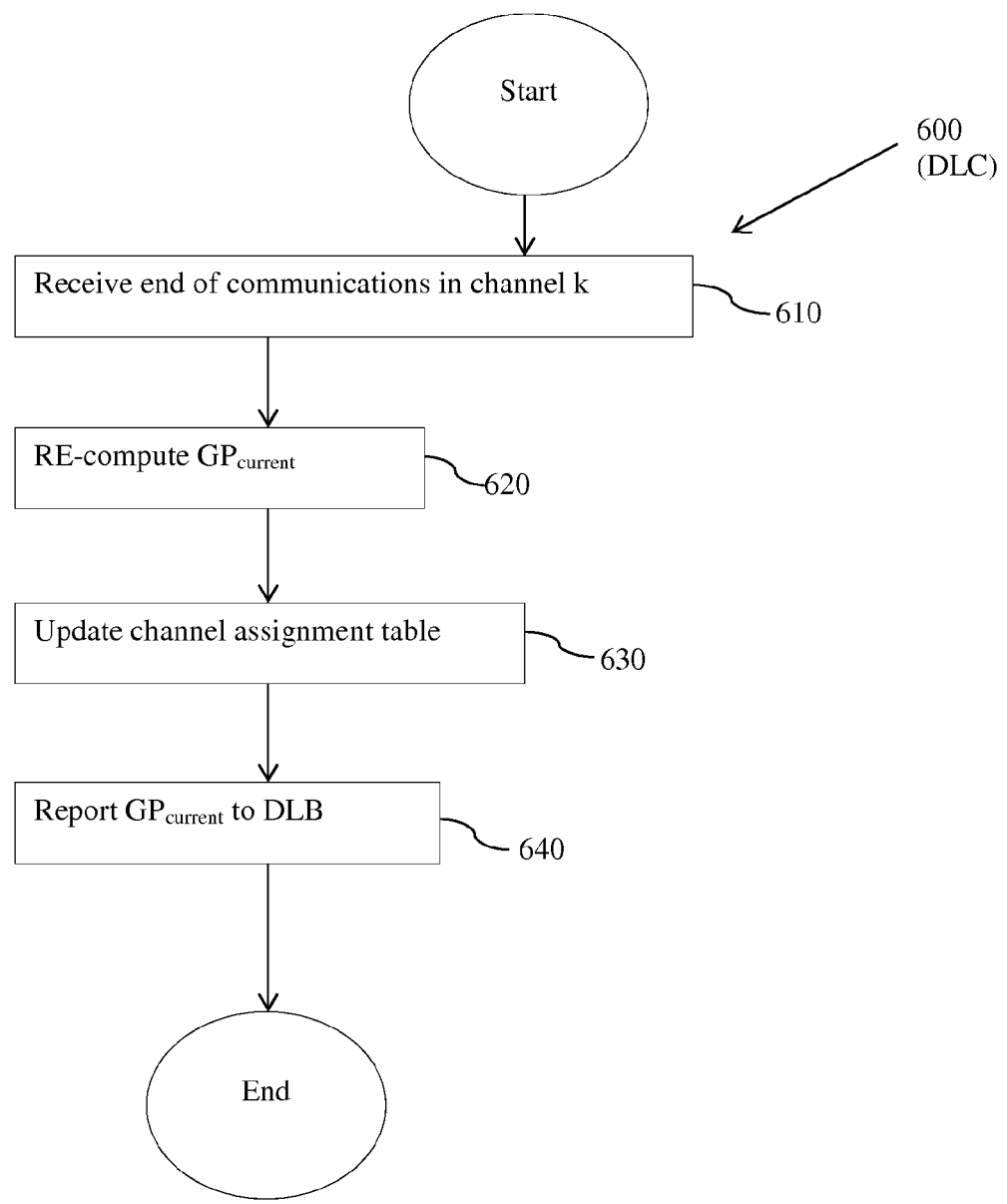
FIG. 6 is a schematic presentation of a process for releasing a channel.

FIG. 6 illustrates, in the form of a flow diagram, a process 600 for releasing a codec. Process 600 is part of the DLC process and is carried out for a particular DSP if a communication that has been conducted via a channel k has ended. In this case, a communications control process (not shown in greater detail) transmits a message concerning the end of the communication in channel k to the DLC process of the concerned DSP. The message can also be received via the DLB process and transmitted to the DLC process.

It is assumed in the present numeric example that the communication in channel 2 of DSP3 has ended and that a corresponding message has been transmitted to the DLC process DLC3 of DSP3.

After process 600 has started or has been called up, the message concerning the end of the communication is received in channel k in step 610.

A new value $GP_{current,new}$ for the DSP, which arises from the omission of the performance value PpC for channel k, is then computed in step 620. The computation follows the relationship below:

$$GP_{current,new} = GP_{current} - PpC(k) \quad \text{(Equation 9)}$$
$$= 114 - 14$$
$$= 100$$

The channel assignment table is then updated in step 630. I.e., the value for the codec in channel k is set to "0". In the present numeric example (k=2), the channel assignment arises after updating according to the following table:

TABLE 14

Channel assignment after release of channel

| | Channel k | | | |
|---|---|---|---|---|
| | 1 | 2 | 3 | ... |
| Codec | G.723 | (—) | G.729 | ... |
| PpC | 14 | 0 | 20 | ... |

As apparent from Table 14, the values for channel 2, which have previously been assigned by the values for T.38 (see Table 1), have been deleted. If the total performance is included in the base data BD of the DSP, the value $GP_{current}$ is overwritten by the new value $GP_{current,new}$ in the base data.

In the end, the new value for $GP_{current}=GP_{current,new}$ is reported to the DLB process in step 640. Process 600 then ends.

Although not shown in greater detail in the figure, the performance table is updated with the new $GP_{current}$ for the reporting DSP in the DLB process, as is apparent from the following table:

TABLE 15

Performance table after channel release

| DSP | $GP_{max}$ | $GP_{current}$ | $GP_{inProc}$ | $PpC_{max}$ | $H_{max}$ |
|---|---|---|---|---|---|
| 1 | 100 | 90 | 0 | 20 | 24 |
| 2 | 200 | 120 | 0 | 25 | 30 |
| 3 | 200 | 100 | 1 | 25 | 30 |
| 4 | 120 | 70 | 2 | 10 | 16 |

A rejection of the codec change in step 535 (FIG. 5) means that the hysteresis requirement for the DSP has been estimated too low. In a process not described or presented here in greater detail, rejections of codec changes can be observed and the hysteresis requirement can be increased if required, if a rejection occurs often. It is also conceivable to provide a process that reduces the hysteresis requirement for all or some DSPs in case of frequent rejections of requests for channel assignments in step 325 (FIG. 3).

After a rejection of a codec change, the DLB process can attempt to find an available DSP by carrying out a process 300 according to FIG. 3 and to distribute the communications connection that requests the codec change with the newly requested codec to a different DSP.

LIST OF REFERENCE SIGNS AND SYMBOLS

100 System
111-114 Digital signal processors DSP1-DSP4
120 Host processor
130 DSP load balancing process (DLB process)
141-144 DSP load controller processes (DLC processes) DLC1-DLC4
  150 Memory
  160 DLB memory area
  171-174 DLC memory areas
  200 DLC notification process (2xx: process steps)
  300 DLB channel request process (3xx: process steps)
  400 DLC channel request process (4xx: process steps)
  500 DLC channel change process (5xx: process steps)
  600 DLC channel release process (6xx: process steps)
  i Control variable for codecs
  k Control variable for channels
  n Number of supported codecs in one DSP
  r Relative load reserve
BD Base data
DLB DSP Load Balancing
DLC DSP Load Control
DSP Digital signal processor
GP Total performance
$GP_{current}$ Total performance of a DSP
$GP_{max}$ Maximum total performance of a DSP
$H_{max}$ Maximum hysteresis of a DSP
HB Hysteresis requirement of a DSP
K Number of channels in a DSP
KT Channel assignment table
PpC Performance requirement of a codec (Performance per codec)
$PpC_{max}$ Maximum performance requirement of a DSP
$PpC_{min}$ Minimum performance requirement of a DSP
PT Performance table The list above is an integral component of the description

The invention claimed is:

1. A method for channel management of digital signal processors in at least one communication device, the method comprising:
  determining which digital signal processor (DSP) of the DSPs to send a new channel request to establish a communication channel by a process, each DSP having a number of supported codecs that have performance requirements, each of the DSPs having a maximum performance requirement that is a greatest performance requirement of all the codecs supported by that DSP and a minimum performance requirement that is a lowest performance requirement of all the codecs supported by that DSP, each of the DSPs also having a maximum hysteresis requirement and a maximum numeric performance value, the process comprising:
  determining a current performance of each of the DSPs by adding a maximum hysteresis requirement and a maximum performance requirement to a current performance value stored in a performance table for the DSP,
  identifying at least one of the DSPs as an available DSP for the new channel request upon determining that the determined current performance for that DSP is less than the maximum numeric performance value for that DSP,
  determining that one of the at least one identified available DSP has a lowest load; and
  nominating the identified available DSP determined to have the lowest load to have the new channel request assigned to that identified available DSP.

2. The method of claim 1, comprising:
  adjusting the performance table for the nominated DSP to account for a processing load that is associated with the new channel request in response to the nominating of that DSP.

3. The method of claim 1, comprising:
  directing the new channel request to the nominated DSP;
  computing a current performance of the nominated DSP by a DSP load controller for that nominated DSP in response to receiving the new channel request;
  adding the maximum performance requirement and the maximum hysteresis requirement to the computed current performance of the nominated DSP to identify a performance sum by the DSP load controller; and
  accepting the new channel request by the DSP load controller upon a determination that the performance sum for the nominated DSP is less than the maximum numeric performance value for that DSP.

4. The method of claim 3, wherein the accepting of the new channel request by the DSP load controller comprises:
  identifying a codec for the new channel request by the DSP load controller;
  correcting a channel assignment of the nominated DSP for a channel of the new channel request in response to identifying the codec for the new channel request.

5. The method of claim 4, comprising:
  updating a current performance value for the nominated DSP in a performance table with a current performance of the nominated DSP that is determined after the channel assignment of the nominated DSP is corrected.

6. The method of claim 3, comprising:
receiving a request for a codec change to change a codec for a channel of the nominated DSP that was assigned to the new channel request from a first codec to a second codec;
adjusting the current performance value for the nominated DSP to account for a change in codec from the first codec to the second codec identified in the received request for a codec change and comparing the adjusted current performance value to the maximum numeric performance value for the nominated DSP;
accepting the codec change of the request for the codec change when the maximum numeric performance value is greater than the adjusted current performance value; and
rejecting the codec change of the request for the codec change when the maximum numeric performance value is less than the adjusted current performance value.

7. The method of claim 6, comprising:
adjusting the codec for the channel to be the second codec that was identified in the request for the codec change in response to accepting the codec change.

8. The method of claim 7, comprising:
updating a channel assignment table for the nominated DSP to account for the change in codec to the second codec made in response to the request for the codec change; and
reporting the current performance value for the nominated DSP that results from the adjusting of the codec.

9. The method of claim 8, comprising:
updating of the performance table for the nominated DSP in response to the reporting of the current performance value for the nominated DSP that results from the adjusting of the codec.

10. The method of claim 9, wherein the adjusting of the current performance value for the nominated DSP to account for the change in codec from the first codec to the second codec identified in the received request for the codec change and comparing the adjusted current performance value to the maximum numeric performance value for the nominated DSP is performed by the DSP load controller for the nominated DSP;
the adjusting of the codec for the channel to be the second codec identified in the request for the codec change in response to accepting the codec change is performed by the DSP load controller; and
the updating of the channel assignment table for the nominated DSP to account for the change in codec to the second codec made in response to the request for the codec change is performed by the DSP load controller.

11. The method of claim 6, comprising:
increasing the maximum hysteresis requirement for the nominated DSP in response to the rejecting of the codec change.

12. The method of claim 6, comprising:
adjusting the maximum hysteresis requirement for the nominated DSP in response to the rejecting of the codec change.

13. A method for channel management of digital signal processors in at least one communication device, the method comprising:
determining which digital signal processor (DSP) of the DSPs to send a new channel request to establish a communication channel by a process, each DSP of the DSPs having a number of supported codecs that have performance requirements, each of the DSPs having a maximum performance requirement that is a greatest performance requirement of all the codecs supported by that DSP and a minimum performance requirement that is a lowest performance requirement of all the codecs supported by that DSP, each of the DSPs also having a maximum hysteresis requirement and a maximum numeric performance value, the process comprising:
determining a current performance of each of the DSPs by adding the maximum hysteresis requirement and the maximum performance requirement to a current performance value stored in a performance table for the DSP,
identifying at least one of the DSPs as an available DSP for the new channel request upon determining that the determined current performance for that DSP is less than the maximum numeric performance value for that DSP,
determining that one of the at least one identified available DSP has a lowest load;
nominating the identified available DSP determined to have the lowest load to have the new channel request assigned to that identified available DSP;
adjusting a performance table for the nominated DSP to account for the determined current performance of that DSP in response to the nominating of that DSP;
directing the new channel request to a DSP load controller for the nominated DSP;
computing a current performance of the nominated DSP by the DSP load controller in response to receiving the new channel request;
adding the maximum performance requirement and the maximum hysteresis requirement to the computed current performance of the nominated DSP by the DSP load controller to identify a performance sum;
accepting the new channel request by the DSP load controller upon a determination that the performance sum for the nominated DSP is less than the maximum numeric performance value for that DSP, the accepting of the new channel request by the DSP load controller comprising:
identifying a codec for the new channel request by the DSP load controller, and
correcting a channel assignment of the nominated DSP for a channel of the new channel request in response to identifying the codec for the new channel request; and
directing the new channel request to the nominated DSP in response to the accepting of the new channel request.

14. The method of claim 13, comprising
updating a current performance value for the nominated DSP in a performance table with a current performance of the nominated DSP that is determined after the channel assignment of the nominated DSP is corrected and the new channel request is accepted by the DSP load controller.

15. The method of claim 13, comprising:
receiving a request for a codec change for the channel of the nominated DSP that was assigned to the new channel request by the DSP load controller;
adjusting the current performance value for the nominated DSP to account for a change in codec identified in the received request and comparing the adjusted current performance value to the maximum numeric performance value for the nominated DSP by the DSP load controller;

accepting the codec change of the request for the codec change by the DSP load controller when the maximum numeric performance value is greater than the adjusted current performance value; and rejecting the codec change of the request for the codec change by the DSP load controller when the maximum numeric performance value is less than the adjusted current performance value.

16. The method of claim 15, comprising:

adjusting the codec for the channel of the nominated DSP to be the codec identified in the request for the codec change in response to accepting the codec change.

17. The method of claim 16, comprising:

updating of a channel assignment table by the DSP load controller for the nominated DSP to account for the change in codec made in response to the request for the codec change; and reporting the current performance value for the nominated DSP that results from the adjusting of the codec by the DSP load controller.

18. The method of claim 17, comprising:

updating of the performance table for the nominated DSP by a processor running a DSP load balancing process in response to the reporting of the current performance value for the nominated DSP that results from the adjusting of the codec.

19. The method of claim 13, comprising:

receiving a request for a codec change for the channel of the nominated DSP that was assigned to the new channel request by the DSP load controller;

adjusting the current performance value for the nominated DSP to account for a change in codec identified in the received request and comparing the adjusted current performance value to the maximum numeric performance value for the nominated DSP by the DSP load controller;

rejecting the codec change of the request for the codec change by the DSP load controller upon a determination that the maximum numeric performance value is less than the adjusted current performance value; and increasing the maximum hysteresis requirement for the nominated DSP in response to the rejecting of the codec change.

20. A communication device comprising:

a host processor, non-transitory memory that is communicatively connected to the host processor and a plurality of digital signal processors communicatively connected to the non-transitory memory, each of the digital signal processors configured to encode and decode signals transmitted along at least one communication channel assigned to the digital signal processor;

the communication device configured to perform the method for channel management of the digital signal processors of the communication device in accordance with the method of claim 1.

* * * * *